United States Patent [19]
Cho

[11] Patent Number: 4,975,944
[45] Date of Patent: Dec. 4, 1990

[54] METHOD OF MAKING CALL-WAIT AND CALL-ALTERNATION IN ELECTRONIC PRIVATE BRANCH EXCHANGE (EPBX)

[75] Inventor: Seung-Hwan Cho, Inchun, Rep. of Korea

[73] Assignee: SamSung Electronics Co., Ltd., Suweon City, Rep. of Korea

[21] Appl. No.: 400,948

[22] Filed: Aug. 31, 1989

[30] Foreign Application Priority Data

Aug. 31, 1988 [KR] Rep. of Korea .......... 1988-11201[U]

[51] Int. Cl.$^5$ ........................ H04M 3/48; H04M 3/54
[52] U.S. Cl. .................................... 379/209; 379/210; 379/215
[58] Field of Search ............... 379/201, 209, 210, 211, 379/212, 214, 215; 370/62

[56] References Cited

U.S. PATENT DOCUMENTS

4,873,719 10/1989 Reese ................................. 379/215

Primary Examiner—James L. Dwyer
Attorney, Agent, or Firm—Robert E. Bushnell

[57] ABSTRACT

There is disclosed a method of making a call in an electronic private branch exchange system (EPBX), calling a subscriber pre-engaged in a call and thereby performing call-wait and call-alternation. The improvement performs a call-wait state so that a calling subscriber of an EPBX can be automatically linked up with a target subscriber of the EPBX, later on, if the target subscriber is already engaed in other call when the calling subscriber makes a call to the target subscriber. The invention also provides a subscriber of an EPBX with a method capable of switching a call central office from a line to another subscriber of the EPBX engaged in the other call.

1 Claim, 7 Drawing Sheets

METHOD OF MAKING CALL-WAIT AND CALL-ALTERNATION IN ELECTRONIC PRIVATE BRANCH EXCHANGE (EPBX)

BACKGROUND OF THE INVENTION

The present invention relates to a method of making a call in an electronic private branch exchange system (hereinafter referred to as EPBX), more particularly to a method of calling a subscriber pre-engaged in a call and thereby performing call-wait and call-alternation.

In a conventional EPBX, when making a call to a subscriber pre-engaged in a call, a calling party has to either try again or make a call reservation to again call the subscriber only after he ends his own call engaged. In addition, when switching an external call from a central office line (hereinafter, referred to a "C.O. line") to an internal subscriber of the EPBX, it is not possible to give notice to the subscriber of the arrival of the call if the subscriber is already engaged in other call. As a result, the conventional EPBX has such a drawback that the calling subscriber of the C.O. line has to give up the call and try it again later on, and furthermore, even if it is possible to notice the desired internal subscriber of the arrival of the call from a C.O. line subscriber, the only way the called party can talk with the calling party is by quitting the current telephone conversation.

SUMMARY OF THE INVENTION

Therefore, an object of the present invention is to provide a method of performing a call-wait state so that a calling subscriber of an EPBX can be automatically linked up with a target subscriber of the EPBX, later on, if the target subscriber is already engaged in other call when the calling subscriber makes a call to the target subscriber.

Another object of the present invention is to provide a subscriber of an EPBX with a method capable of switching a call arrived from a C.O. line to another subscriber of the EPBX engaged in the other call.

According to one aspect of the invention, the method includes the steps of:

(a) checking whether or not a call-wait key is pressed by the third subscriber, and if pressed, notifying the first subscriber, who is pre-engaged in a call, that there is a subscriber waiting with call-wait for the first subscriber and, making said third subscriber into call-wait-hold state;

(b) after said step (a) is performed, checking whether or not said third subscriber has hooked on;

(c) if hook-on is performed in the step (b), checking whether or not there was a fourth subscriber talking with said third subscriber, and if there wasn't, canceling the call-wait-hold state and performing a return to an initial state;

(d) if there was a fourth subscriber in said step (c), transferring the call-wait function to said fourth subscriber who was talking with said third subscriber;

(e) sending recall-ring signal to said first subscriber if said third subscriber has hooked off in said step (b) or if it is found out that said first subscriber has hooked on by checking, after said step (d), whether or not said first subscriber has hooked on;

(f) checking whether or not said first subscriber pre-engaged in a call has hooked off in the said step (e), and if hooked off, establishing a speech path with the subscriber with call-wait and performing the return;

(g) if said first subscriber pre-engaged in a call is in the state of hook-off in said step (e), checking whether or not there is a subscriber waiting with call-wait for the first subscriber with a call-alternation key pressed by said first subscriber, and if there isn't, performing the return; and (h) if the call-alternation key is pressed and there is a subscriber with call-wait in said step (g), establishing a speech path between said subscriber who was pre-engaged in a call and the subscriber waiting with call-wait status and returning to the step (f).

BRIEF DESCRIPTION OF THE ATTACHED DRAWINGS

For a better understanding of the invention and to show how the same may be carried into effect, reference will now be made, by way of example, to the accompanying diagrammatic drawings, in which.

DETAILED DESCRIPTION OF THE INVENTION

Figure 1:
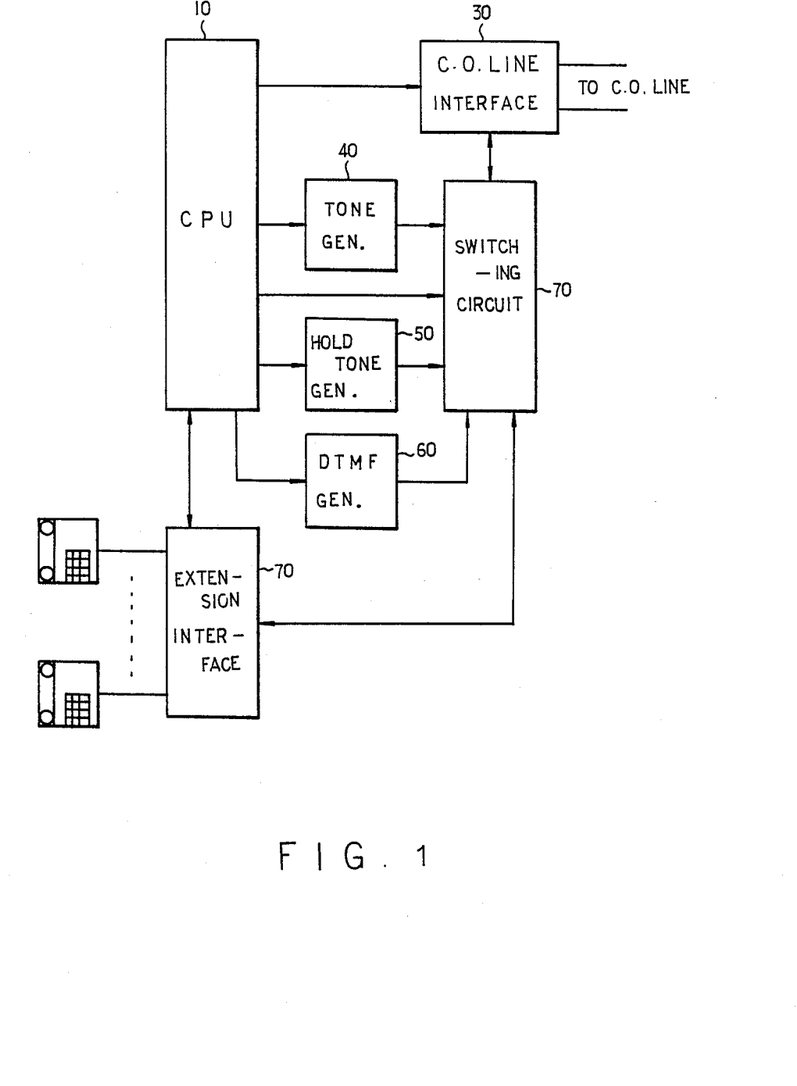
FIG. 1 is a block diagram of an exemplary EPBX system to be applied according to the present invention.

Referring to FIG. 1, a block diagram of an exemplary EPBX to be applied according to the present invention includes:

a central processing unit (CPU) 10 that has a subscriber table which stores therein information on each subscriber and controls the operation of every block of the EPBX;

an extension interface circuit 20 that performs interfacing between a multi-button phone (internal subscriber) and the EPBX under the control of said CPU 10;

a C.O. line interface circuit 30 that performs interfacing between a C.O. switching system and the EPBX under the control of said CPU 10;

a tone generator 40 that supplies a multiplicity of tones, including dial tone and busy tone to the subscribers of the EPBX and the C.O. lines;

a holding tone generator 50 that provides holding tones under the control of said CPU 10 when subscribers of the C.O. line and the EPBX are in the state of call-wait-hold or switching;

a dual-tone multi-frequency (DTMF) generator 60 that sends to the C.O. line digits dialed at a multi-button phone that is a subscriber in the extension interface circuit 20 under the control of said CPU 10; and a switching circuit 70 that switches the speech path of each subscriber under the control of the CPU 10.

Figure 2A:
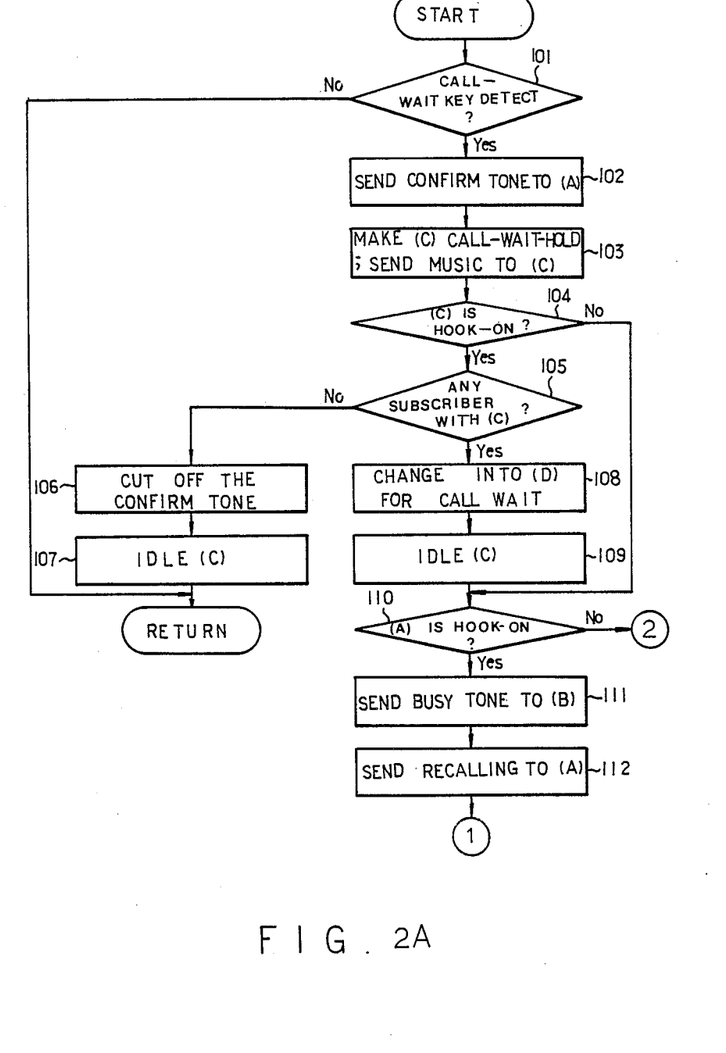
FIG. 2a–c is a flow diagram of the present invention divided into parts as FIGS. 2A, 2B and 2C.
Figure 2B:
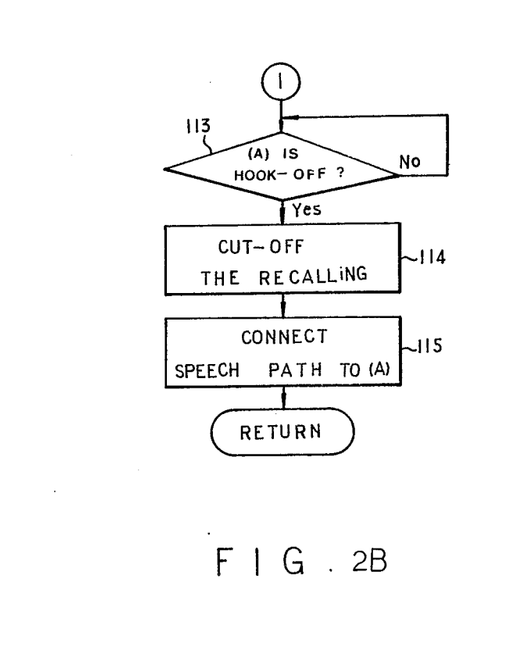
Figure 2C:
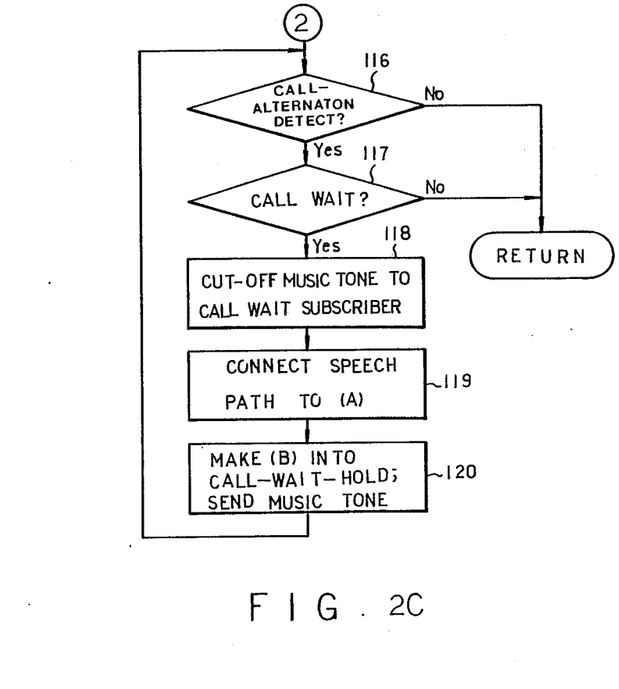

FIG. 2 is a flow diagram of a preferred embodiment according to the present invention, includes steps as follows:

Step (a): when a third subscriber of the EPBX is calling a first subscriber of the EPBX pre-engaged in a call, whether or not the third subscriber has entered call-wait key is checked, and thereafter if entered, said first subscriber pre-engaged in a call is notified that there is a subscriber with call-wait and said third subscriber is put into call-wait-hold state;

Step (b): after said step (a) is executed, whether or not said third subscriber has hooked on is checked;

Step (c): if said hook-on is performed in said step (b), it is checked whether or not there was a fourth subscriber who was talking with said third subscriber, and if there wasn't, the call-wait-hold status is canceled and a return is performed;

Step (d): if there was a fourth subscriber in said step (c), the call-wait function is transferred to the fourth subscriber who was talking with said third subscriber;

Step (e): recall-ring signal is sent to said first subscriber if said third subscriber has hooked off in said step (b) or if it is found out that said first subscriber has hooked on by checking, after step (d), whether or not said first subscriber has hooked on;

Step (f): it is checked whether or not said first subscriber pre- engaged in a call has hooked off in the said step (e), and if hooked off, a speech path is established with the subscriber with call-wait and a return is performed;

Step (g): if said first subscriber pre-engaged in a call is in the state of hook-off in said step (e), it is checked whether or not there is a subscriber waiting with call-wait for the first subscriber with the call-alternation key pressed by said first subscriber, and if there isn't, a return is performed; and Step (h): and if the call-alternation key is pressed and there is a subscriber with call-wait in said step (g), a speech path is established between said subscriber who was pre-engaged in a call and the subscriber waiting with call-wait status and then a return is performed to the step (f).

Figure 3A:
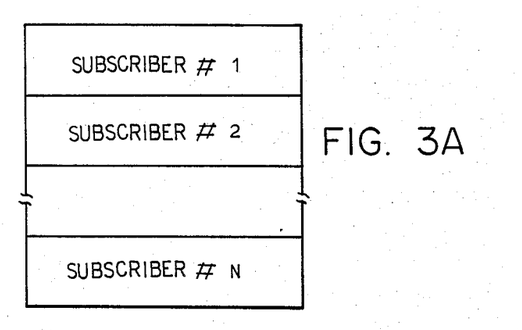
FIGS. 3a–b are schematic diagrams of a the structure of subscriber table according to the invention.
Figure 3B:
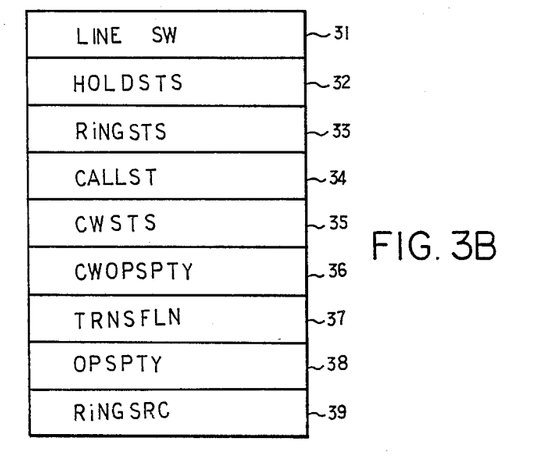

FIG. 3 is a structure diagram of a subscriber table of an EPBX, wherein 3A is a block diagram of the subscriber tables and 3B is a detailed embodiment of each subscriber table. In the drawing, 31 is an area for indicating subscriber status (LINESW), 32 is an area for indicating hold type (HOLDSTS), 33 is an area for indicating ring type (RINGSTS), 34 is an area for indicating call type (CALLST), 35 is an area for indicating call-wait status (CWSTS), 36 is an area which stores subscriber number of a subscriber (CWOPSPTY) who is waiting with call-wait, 37 is an area which stores transferring line number (TRNSFLN), 38 is an area which stores subscriber number (OPSPTY) of a subscriber engaged in a call, and 39 is an area which stores ring source number (RINGSRC).

FIGS. (4A) to (4E) are bit maps of each structure for the FIG. 3B in which: in the bit map (4a), D0-bit is set when a subscriber is in the state of hearing busy tone, D1 bit is set when a subscriber is in the state of hearing ringback tone, D2 bit is set when a subscriber's phone is in the state of ringing, D3-bit is set when a subscriber is in the state of talking, and D4-bit is set when a subscriber is in the state of hold; in the bit map (4B), D10-bit is set when the state is simple-hold, D11-bit is set when the state is transfer-hold, and D12-bit is set when the state is call-wait-hold; in the bit map (4C), D20-bit is set when call-back-ring is ringing, D21-bit is set when recall-ring is ringing, D22-bit is set when extension-ring is ringing, and D23-bit is set when incoming-ring is ringing at the C.O. line; in the bit map (4D), D30-bit is set when the state is a transfer-call and D31-bit is set when a conference-call is being performed; in the bit map (4E), D40-bit is set when the state is call-wait.

Figure 5A:
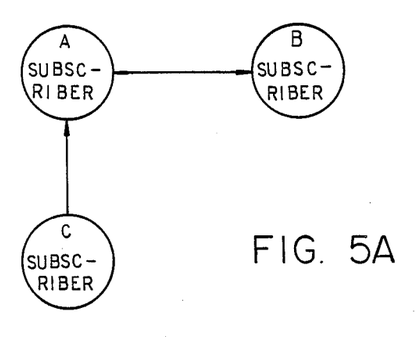
FIGS. 5a–b are diagrams of an exemplary state of call according to the invention.
Figure 5B:
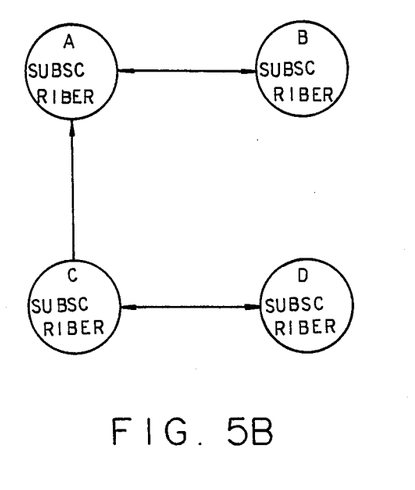

FIG. 5 shows situations in which the present invention can be applied to: herein, FIG. 5A is a diagram showing a case in which a subscriber C calls another subscriber A when the subscriber A is talking with the other subscriber B who is a subscriber of either EPBX or Central Office. In this case, subscriber C hears the call-wait-hold signal when the calling subscriber C presses the call-wait key and the called subscriber A hears a confirmation signal that he is called by a certain subscriber; FIG. 5B is a diagram showing a case in which EPBX subscriber A is talking with C.O. subscriber B and the other subscriber D is asking subscriber C for a transfer to the subscriber A when EPBX subscriber C is talking with the subscriber D of either EPBX or C.O. At this time, if the calling subscriber C transfers a call-wait function to the called subscriber A by performing the transfer function, the calling subscriber C hears a busy tone because the called subscriber A is in the state of talking. In the case, if the subscriber C presses a call-wait key and hooks on, the subscriber D is shifted from the transfer-hold state to call-wait-hold state and hears music, for example, and the subscriber A hears a confirmation signal that he is called.

Figure 4A:
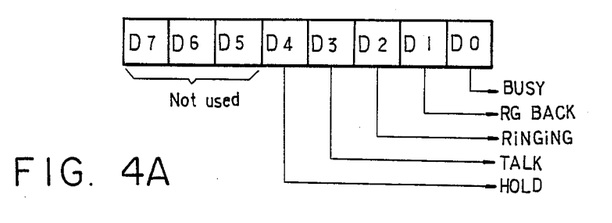
FIGS. 4a–e are schematic diagrams of a the structure of bit map for each subscriber table in the FIG. 3.

When a subscriber of a EPBX calls another subscriber of the EPBX, a central processing unit 10 controls tone generator 40 and sends a busy tone to the calling subscriber. Herein, it is assumed that the called subscriber of the EPBX, who is pre-engaged in a call, is A, the calling subscriber of the EPBX is C and the other subscriber of either the EPBX or a Central Office, who is talking with the subscriber A, is B. In such a situation, the subscriber A is in a state in which the call-state bit D3 of (4A) is set and a port number of subscriber B is stored in the area 38, and the subscriber B is in a state in which the call-state bit D3 of (4A) is set and port number of the subscriber A is stored in the area 38; in addition, as the subscriber C is in the state of hearing the busy tone with the subscriber A called, the port number of the subscriber A is stored in the area 38.

Figure 4B:
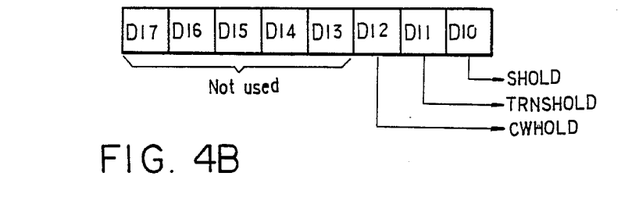
Figure 4C:
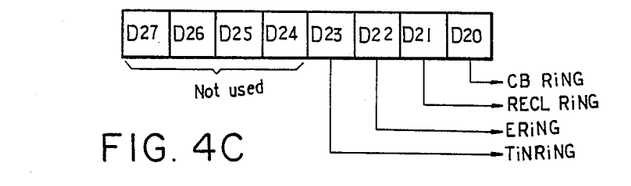
Figure 4D:
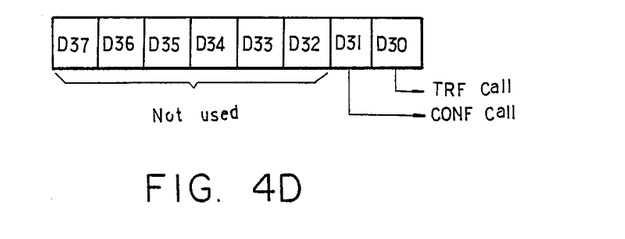
Figure 4E:
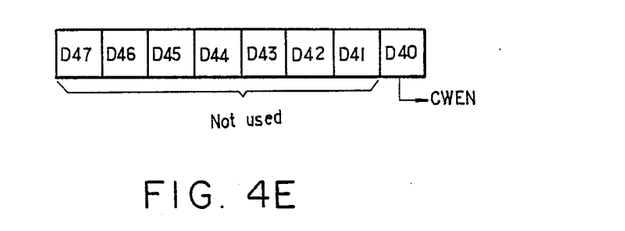

In this state, when the subscriber C presses the call-wait key while hearing busy tone through step 101, and in step 102 the central processing unit 10 recognizes the call-wait signal and sets a bit D41, which indicates whether or not the call-wait state is on in the area 35 of the subscriber table of the subscriber C and stores the port number of the subscriber C, who is in the state of call-wait in the area 36. In addition, to notify that the subscriber C is in the state of call-wait, the central processing unit 10 feeds a periodic confirmation tone to the subscriber A through a tone generator 40. And in step 103, the central processing unit 10 puts the subscriber C into call-wait-hold state, controls hold-tone generator 50 and provides call-wait-hold tone to the subscriber C. At this time, in the subscriber table of the subscriber C, D0-bit of (4A) is reset to get released from the busy state, D4-bit of (4A) is set to bring the call-hold state, D12 of (4B) is set to bring call-wait-hold state and D40 of (4E) is set to bring the call-wait state.

Having performed step 103, in step 104 the central processing unit 10 checks through extension interface circuit 20 to determine whether or not the subscriber C, who is in the call-wait-hold state, has hooked on, and if hooked on, it is checked in step 105 whether or not the subscriber C is currently in the state of talking with a fourth subscriber D. Herein, the subscriber D refers to a subscriber of either an extension or C.O. line. In step 105, if the subscriber C is not in the state of talking, the case becomes that of FIG. 5A. That is, because the state is that the subscriber C, who is in the state of call-wait-hold, has put down handset while the subscribers A and B are talking to each other, the central processing unit 10 proceeds to step 106, resets D40-bit of 4E of the subscriber table of the subscriber A indicating that there is a subscriber of the extension line (the subscriber C herein), initializes the port number, which is stored in the area 36 for a subscriber who is waiting with call-wait, and cuts off a periodic confirmation tone supplied to the subscriber A by controlling the tone generator 40. In addition, in step 107 the central processing unit 10 initializes the subscriber table of the subscriber C, controls a switching circuit 70 so as to make the subscriber C idle and returns. At that time, if in said step 105 there is a subscriber (herein, assumed to be the subscriber D) who is talking with the subscriber C, the state is like that of FIG. 5B which is a case where the subscriber D is asking the subscriber C to transfer an appropriate call to the subscriber A. In this case, if the subscriber C transfers the call to the subscriber A, then the subscriber A is in the state of talking with the subscriber B so that said steps 102, 103 are executed.

Having performed the foregoing steps, because this is a case where the subscriber C has hooked off, in step 108 the central processing unit 10 stores a port number of subscriber D in the area 36 of the subscriber table of the subscriber A in place of the port number of the subscriber C stored therein so as to transfer call-wait from the subscriber C to the subscriber D, resets D11-bit of (4B) of the subscriber table to release the transfer-hold state, and sets D12-bit of (4B) to bring a call-wait-hold state and sets D40-bit of (4E) to indicate call-wait state. That is, step 108 performs a transferring of call-wait for the subscriber A from the subscriber C to the subscriber D. And in step 109, the same function as step 107 is executed. At that time, if the subscriber C is in the state of hook-off in step 104 or after executing step 109, the central processing unit 10 checks in step 110 whether or not the subscriber A has hooked on.

If the subscriber A has hooked on in step 110, in step 111 the central processing unit 10 resets D3-bit of (4A) of the subscriber table of the subscriber B in order to get released from call state and provides a busy tone generated in a tone generator 104 to the subscriber B by setting D0-bit. In addition, in step 112 the central processing unit 10 resets D3-bit of (4A) of the subscriber table of the subscriber A so as to get released from call state, sets D2-bit of the (4A) so as to supply a ringing signal, sets D21-bit of (4C) so as to provide recall ring through the tone generator 40, reads a port number which is in call-wait state to store that port number in the area 39 and then initializes the value of the area 36.

Thereafter, in step 113 the central processing unit 10 controls the extension interface circuit 20 checking whether or not the subscriber A has hooked off, and if hooked off, in step 114 it stops supplying a ringing signal by resetting D2-bit of (4A) of the subscriber table of the subscriber A, sets D3-bit of (4A) indicating call state, reads a port number stored in the area 39 to store the port number in the area 38 and initialize a value of the area 39, and then releases a function, which is indicating the call-wait state, by resetting D40 of (4E).

After executing said step 114, in step 115 the central processing unit 10 resets D4-bit of the subscriber table of a subscriber with a call-wait state for the subscriber A to get released from call-wait state, sets D3-bit to indicate call state, resets D12-bit to release call-wait-hold state, resets D40-bit so as to release call-wait state. As described above, because the subscriber table of both the subscriber A and the subscriber with call-wait are converted, a speech path is established between the said two subscribers. At that time, if the subscriber A is in the state of hook-off, in step 116 the central processing unit 10 checks whether or not the subscriber A has pressed the call alternation key, and if not pressed, it means that the subscriber A is still talking with the subscriber B so that return is performed. However, if pressed, in step 117 the central processing unit 10 checks whether or not there is a subscriber with call-wait, and if there isn't, it returns.

If there is a subscriber with call-wait for the subscriber A in step 117, in step 118 the central processing unit 10 cuts off the call-wait-hold tone supplied to the subscriber with call-wait state by controlling hold tone generator 50, controls the switching circuit 70 so as to establish a speech path between the subscriber A and the subscriber who has been waiting with call-wait. Thereafter, in step 20 the central processing unit resets D3-bit of the subscriber table of the subscriber B who was talking with the subscriber A so as to release call-wait, sets D4-bit to bring hold state, sets D12-bit to bring the call-wait-hold state, sets D40-bit to bring call-wait state, controls the hold tone generator 50 to send a hold tone to the subscriber and then returns to said step 116.

As apparent from the foregoing description, the present invention has such advantages that when a subscriber of an extension line makes a call to another subscriber pre-engaged in a call, the calling subscriber can be put into call-wait state and be linked with the called subscriber by the call alternation function without going through such trouble of calling again or making a reservation, and especially when it is desired to transfer a call coming from the C.O. line to a subscriber who is currently engaged in another telephone conversation, the call-wait function can be performed without having to cut off the call and the call from the C.O. line can be conveniently transferred to the desired subscriber of extension.

While the invention has been particularly shown and described with reference to a preferred embodiment, it will be understood by those skilled in the art that modifications in detail may be made without departing from the spirit and scope of the invention.

What is claimed is:

1. A method of enabling telephone calls by performing call-wait and call-alteration telephone calls when a third subscriber makes a call to a first subscriber already engaged in another telephone conversion in an electronic private branch exchange, said method comprising the steps of:

(a) performing a first set of steps by checking whether a call-wait key is pressed by the third subscriber, and if pressed, notifying the first subscriber while the first subscriber is pre-engaged in a call, that there is a subscriber waiting with call-wait status for the first subscriber and, placing said third subscriber into a call-wait-hold state;

(b) after said first set of steps is performed, performing a second step by checking whether said third subscriber has hooked-on;

(c) if said third subscriber has hooked-on in the second step, performing a third step by checking whether there was a fourth subscriber talking with said third subscriber, and if a fourth subscriber wasn't talking with said third subscriber, canceling the call-wait-hold state and performing a return to an initial state;

(d) if a fourth subscriber was found to be talking with said third subscriber in said third step, performing a fourth step by transferring the call-wait function to said fourth subscriber who was talking with said third subscriber;

(e) performing a fifth step by sending a recall-ring signal to said first subscriber if said third subscriber has hooked off in said second step or if it is found that said first subscriber has hooked-on by checking, after said fourth step, whether or not said first subscriber has hooked-on;

(f) checking in a sixth step, whether said first subscriber pre-engaged in a call has hooked-off in the said fifth step, and if said first subscriber has hooked off in said fifth step, establishing a speech path with the subscriber with call-wait status and performing the return;

(g) if said first subscriber pre-engaged in a call is in the state of hook-off in said fifth step, checking in a seventh step whether there is a subscriber waiting with call-wait status for the first subscriber with the call-alteration key pressed by said first subscriber, and if there isn't a subscriber waiting with call-wait status for the first subscriber, performing the return; and (h) if the call-alteration key is pressed and there is a subscriber with call-wait status in said seventh step, establishing a speech path between said subscriber who was pre-engaged in a call and the subscriber waiting with call-wait status and returning to the sixth step.

* * * * *